(12) United States Patent
Jiang

(10) Patent No.: US 12,408,103 B2
(45) Date of Patent: Sep. 2, 2025

(54) METHODS AND APPARATUSES FOR CELL RESELECTION AND INFORMATION TRANSMISSION

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 554 days.

(21) Appl. No.: 17/793,636

(22) PCT Filed: Jan. 20, 2020

(86) PCT No.: PCT/CN2020/073289
§ 371 (c)(1),
(2) Date: Jul. 18, 2022

(87) PCT Pub. No.: WO2021/146856
PCT Pub. Date: Jul. 29, 2021

(65) Prior Publication Data
US 2023/0051569 A1    Feb. 16, 2023

(51) Int. Cl.
*H04W 48/16* (2009.01)
*H04W 28/16* (2009.01)

(52) U.S. Cl.
CPC ............ *H04W 48/16* (2013.01); *H04W 28/16* (2013.01)

(58) Field of Classification Search
CPC ..................... H04W 48/20; H04W 48/16–18
USPC ........................................................ 455/436
See application file for complete search history.

(56) References Cited

U.S. PATENT DOCUMENTS

| | | | | |
|---|---|---|---|---|
| 2010/0227627 A1* | 9/2010 | Ishii | ...................... | H04W 8/06 455/456.2 |
| 2010/0240367 A1* | 9/2010 | Lee | ..................... | H04W 36/142 455/435.2 |
| 2013/0287002 A1* | 10/2013 | Kim | ...................... | H04W 36/16 370/331 |
| 2014/0106749 A1* | 4/2014 | Wegmann | ............. | H04W 48/18 455/436 |
| 2016/0135247 A1* | 5/2016 | Ozturk | ............. | H04W 36/0094 455/436 |
| 2018/0352488 A1* | 12/2018 | Selvaganapathy | .... | H04W 76/15 |

(Continued)

FOREIGN PATENT DOCUMENTS

| | | |
|---|---|---|
| CN | 101796857 A | 8/2010 |
| CN | 104813712 A | 7/2015 |

(Continued)

OTHER PUBLICATIONS

International Search Report of PCT/CN2020/073289 dated Oct. 21, 2020 with English translation, (4p).

(Continued)

*Primary Examiner* — Qutbuddin Ghulamali
(74) *Attorney, Agent, or Firm* — Arch & Lake LLP

(57) ABSTRACT

A method for cell reselection performed by a terminal includes: receiving, by the terminal, priority information relating to a tracking area (TA); and on the basis of the priority information, implementing, by the terminal, cell reselection. A method for information transmission, including: issuing, by a base station, priority information relating to a TA, wherein the priority information is configured for cell reselection of a terminal.

20 Claims, 5 Drawing Sheets

(56) References Cited

U.S. PATENT DOCUMENTS

2019/0349774 A1* 11/2019 Lou ................ H04W 36/13
2019/0386874 A1* 12/2019 Liu ................ H04W 48/18

FOREIGN PATENT DOCUMENTS

| | | | |
|---|---|---|---|
| CN | 109769412 | A | 5/2019 |
| EP | 2111074 | A1 | 10/2009 |
| JP | 2009077368 | A | 4/2009 |
| WO | 2016181040 | A1 | 11/2016 |
| WO | 2019100242 | A1 | 5/2019 |
| WO | 2019119377 | A1 | 6/2019 |
| WO | 2019137337 | A1 | 7/2019 |

OTHER PUBLICATIONS

Qualcomm Inc., "Idle Mode Cell Reselection based on CN Type Supported", 3GPP TSG-RAN WG2 Meeting #108, R2-1914789, Reno, NV, Nov. 8, 2019, (3p).
JPOA issued in Application No. 2022-543788 dated Feb. 27, 2024 with English translation, (6p).
INOA of Application No. 202247046120 dated on Jun. 12, 2022 with English translation,(7p).
Extended European Search Report issued in Application No. 20915311.3, dated on Dec. 14, 2022,(16p).
OA for RU Application No. 2022122424 dated on Nov. 28, 2022, with English translation,(15p).
Vivo,"Cell selection / reselection with network slicing", 3GPP TSG-RAN WG2 Meeting #99bis,R2-1711080, Prague, Czech Republic, Oct. 9-13, 2017,(3p).

\* cited by examiner

METHODS AND APPARATUSES FOR CELL RESELECTION AND INFORMATION TRANSMISSION

CROSS-REFERENCE TO RELATED APPLICATION

This application is the US national phase application of International Application No. PCT/CN2020/073289, filed on Jan. 20, 2020, the entire content of which is incorporated herein by reference for all purposes.

TECHNICAL FIELD

The present disclosure relates to the field of wireless communication, but is not limited to the field of wireless communication, and in particular, relates to a method and an apparatus for cell reselection, a method and an apparatus for information transmission, a communication device, and a storage medium.

BACKGROUND 5G introduces network slicing technology, which allows the network (core network and/or access network) to be divided into multiple network slices. Different services are transmitted in different network slices and do not interfere with each other.

The terminal will perform cell reselection according to its location during the moving process. However, sometimes the cell selected by the terminal cannot provide the network slice required by the terminal, so that the communication quality of the terminal cannot meet expectations. Sometimes, the terminal frequently performs cell reselection due to network slicing.

SUMMARY

A first aspect of the present disclosure provides a method for cell reselection. The method is applied to a terminal, and includes: receiving priority information relating to a tracking area (TA); performing cell reselection according to the priority information.

A second aspect of the present disclosure provides a method for information transmission. The method is applied to a base station, and includes: issuing priority information relating to a TA, wherein the priority information is configured for cell reselection of a terminal.

A third aspect of the present disclosure provides a communication device, including: an antenna; a memory; a processor, connected to the antenna and the memory respectively, and configured to control the antenna to send and receive radio signals by executing an executable program stored in the memory, and being capable of implementing steps of the method provided in the first aspect or the second aspect.

DETAILED DESCRIPTION

Exemplary embodiments will be described in detail herein, examples of which are illustrated in the accompanying drawings. Where the following description refers to the drawings, the same numerals in different drawings refer to the same or similar elements unless otherwise indicated. The implementations described in the exemplary embodiments below are not intended to represent all implementations consistent with this disclosure. Rather, they are merely examples of apparatus and methods consistent with some aspects of the present disclosure as recited in the appended claims.

The terms used in the embodiments of the present disclosure are only for the purpose of describing particular embodiments, and are not intended to limit the embodiments of the present disclosure. As used in the embodiments of the present disclosure and the appended claims, the singular forms "a," "the," and "said" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the words "if" as used herein can be interpreted as "in a case of" or "when" or "in response to determining."

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
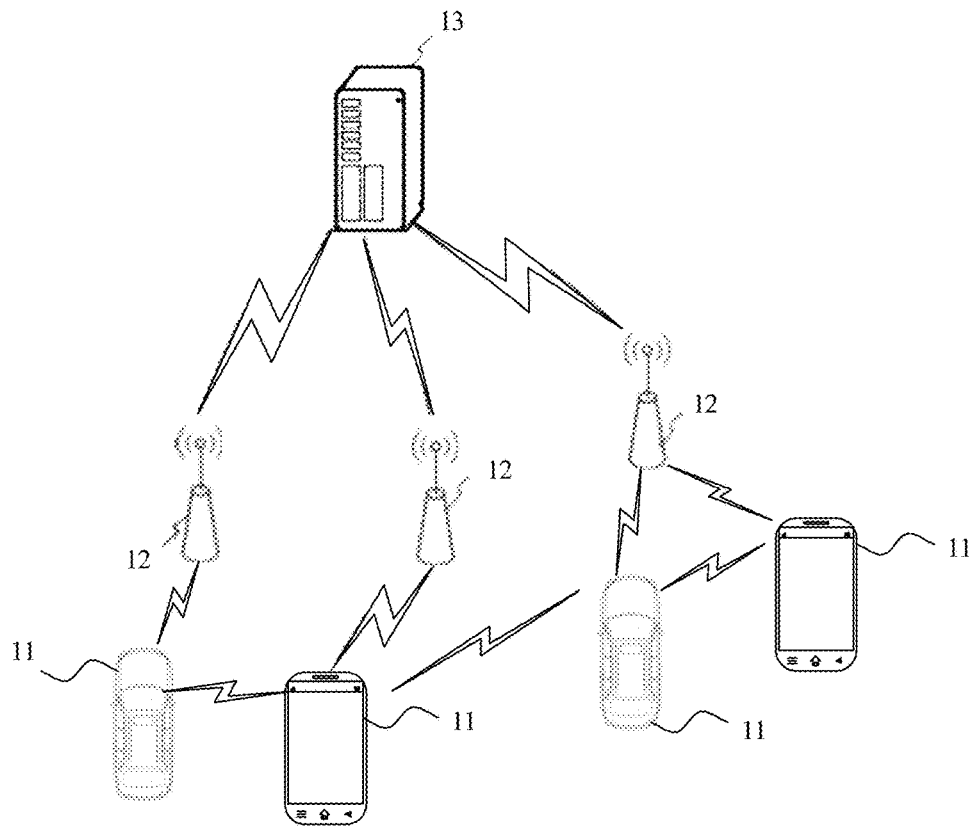
FIG. 1 is a schematic diagram of a wireless communication system provided by an embodiment of the present disclosure.

Please refer to FIG. 1, which shows a schematic diagram of a wireless communication system provided by an embodiment of the present disclosure. As shown in FIG. 1, the wireless communication system is a communication system based on cellular mobile communication technology, and the wireless communication system may include: several terminals 11 and several base stations 12.

The terminal 11 may be a device that provides voice and/or data connectivity to the user. The terminal 11 may communicate with one or more core networks via a Radio Access Network (RAN), and the terminal 11 may be an IoT terminal such as a sensor device, a mobile phone (or "cellular" phone) and a computer of the IoT terminal, for example, may be a fixed, portable, pocket, hand-held, computer built-in or a vehicle-mounted device, for example, Station (STA), subscriber unit, subscriber station, mobile station, mobile, remote station, access point, remote terminal, access terminal, user terminal, user agent, user device, or user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device externally connected to the trip computer. Alternatively, the terminal 11 may also be a roadside device, for example, a street light, a signal light, or other roadside devices with a wireless communication function.

The base station 12 may be a network-side device in the wireless communication system. The wireless communication system may be the 4th generation mobile communication (4G) system, also known as Long Term Evolution (LTE) system; or, the wireless communication system may also be a 5G system, also known as new radio (NR) system or 5G NR system. Alternatively, the wireless communication system may also be a next-generation system of the 5G system. The access network in the 5G system may be called NG-RAN (New Generation-Radio Access Network). Alternatively, the wireless communication system is the MTC system.

The base station 12 may be an evolved base station (eNB) used in the 4G system. Alternatively, the base station 12 may also be a base station (gNB) that adopts a centralized-distributed architecture in the 5G system. When the base station 12 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; a physical (PHY) layer protocol stack is provided in the distributed unit, and the specific implementation of the base station 12 is not limited in embodiments of the present disclosure.

A wireless connection can be established between the base station 12 and the terminal 11 through a radio air interface. In different embodiments, the radio air interface is a radio air interface based on the fourth generation mobile communication network technology (4G) standard; or, the radio air interface is a radio air interface based on the fifth generation mobile communication network technology (5G) standard, such as a new air interface; or, the radio air interface may also be a radio air interface based on a next-generation mobile communication network technology standard of 5G.

In some embodiments, an E2E (End to End) connection may also be established between the terminals 11, for example, in scenarios such as V2V (vehicle to vehicle) communication, V2I (vehicle to Infrastructure) communication and V2P (vehicle to pedestrian) communication in V2X (vehicle to everything) communication.

In some embodiments, the above wireless communication system may further include a network management device 13.

Several base stations 12 are respectively connected to the network management device 13. The network management device 13 may be a core network device in the wireless communication system. For example, the network management device 13 may be a mobility management entity (MME) in an evolved packet core (EPC) network. Alternatively, the network management device may also be other core network devices, such as a serving gateway (SGW), a public data network gateway (PGW), a policy and charging rules function (PCRF) or home subscriber server (HSS), etc. The implementation form of the network management device 13 is not limited in embodiments of the present disclosure.

Figure 2:
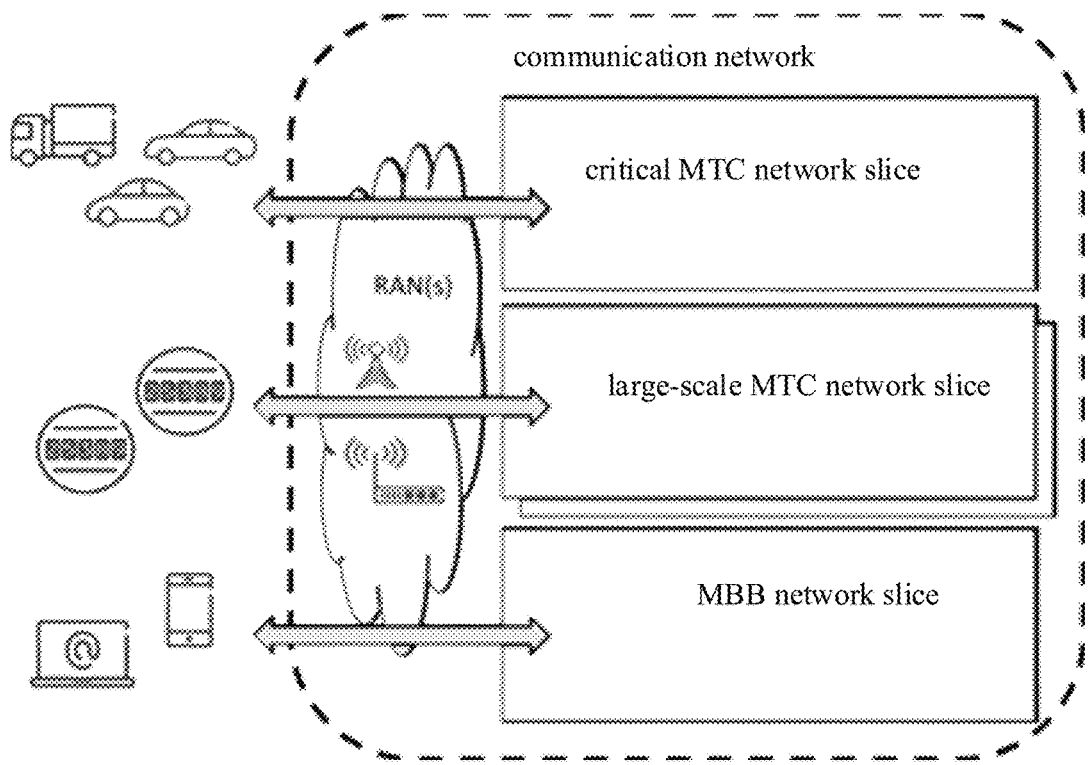
FIG. 2 is a schematic diagram of a network slicing provided by an embodiment of the present disclosure.

As shown in FIG. 2, some communication networks may provide network slices that support different types of services. As shown in FIG. 2, three different types of services (critical MTC services, such as data of health monitoring equipment, massive MTC services, such as meter reading services, MBB services, such as video services) are divided into three network slices. The charging policies, security policies, and quality of service (QoS) policies of respective network slices may be different. Large-scale service congestion in one network slice will not affect the normal operation of services in other network slices.

Figure 3:
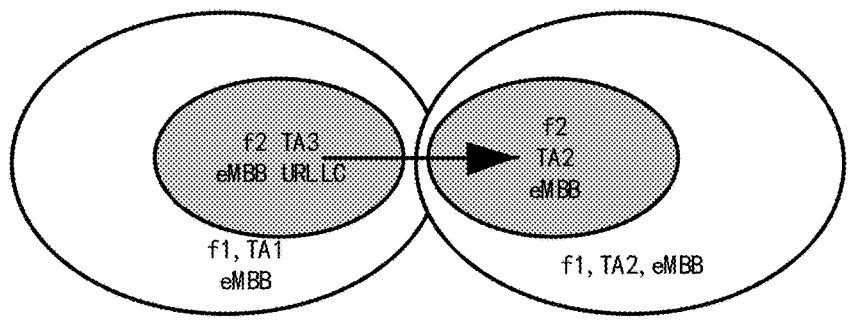
FIG. 3 is a schematic diagram of a tracking area, a frequency point and a network slice provided by the present disclosure.
Figure 4:
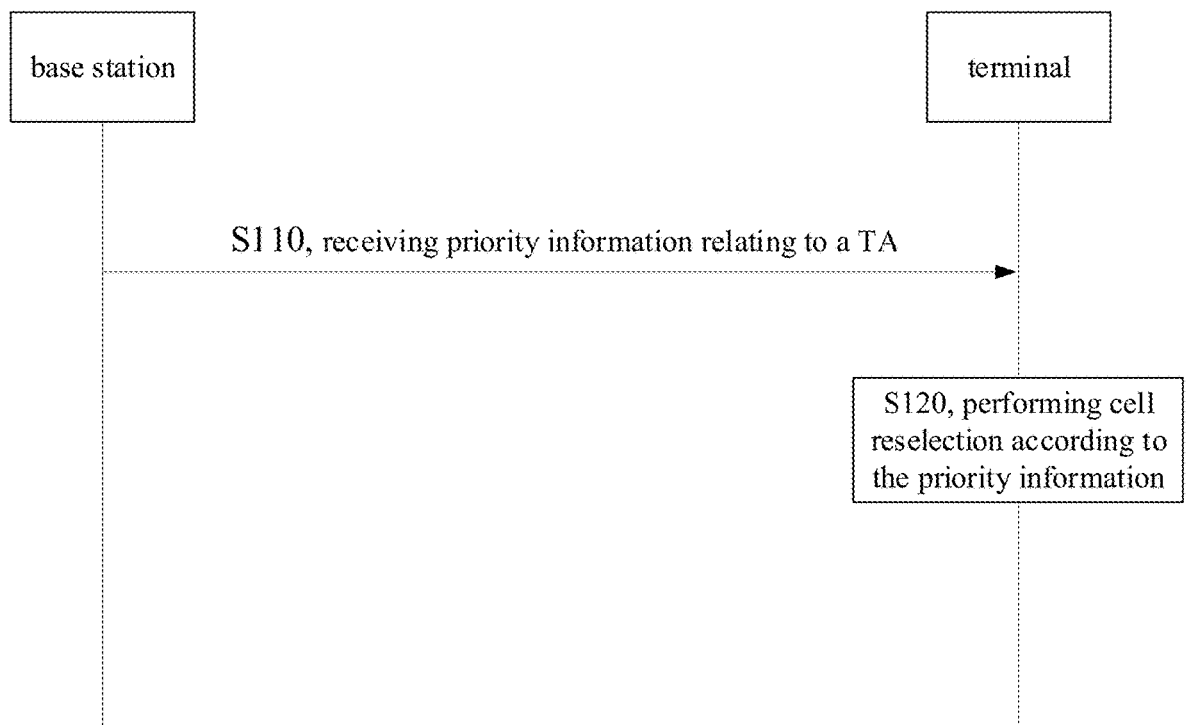
FIG. 4 is a schematic flowchart of a method for cell reselection provided by an embodiment of the present disclosure.

As shown in FIG. 3, the cell corresponding to the frequency point f1 of TA1 and TA2 supports eMBB network slice, the cell corresponding to the frequency point f2 of TA3 supports eMBB and URLLC network slices, and the cell corresponding to the frequency point f2 of TA2 supports eMBB network slice. For a UE that supports eMBB and URLLC network slices, when it is in the cell corresponding to the frequency point f1 of TA1, the network expects the priority of the frequency point f2 to be lower than that of the frequency point f1; this requirement cannot be configured through dedicated signaling. A proposed solution is that since the UE needs to do a Tracking Area Update (TAU) when entering a new TA, the network can send the updated frequency point priority during the TAU. However, the problem cannot actually be solved, because the TAU occurs after the reselection, and the UE has already selected the wrong frequency point based on the previous frequency point priority during the reselection. In view of this, as shown in FIG. 4, this embodiment provides a method for cell reselection. The method is applied to a terminal, and includes:

S110: receiving priority information relating to the TA;
S120: performing cell reselection according to the priority information.

In this embodiment of the present disclosure, the method may be applied to various terminals that support network slicing, and the terminals may include: conventional terminals, IoT terminals, vehicle-mounted terminals, or lightweight terminals. The conventional terminal may include a mobile phone and the like, and another example is a Long Term Evolution (LTE) terminal and the like.

The priority information relating to the TA in embodiments of the present disclosure is: indication information related to priorities relating to the TA, for example, including but not limited to the priority information of the TA alone, the priority of the TA combined with the carrier or the supported network slice. Of course, this is only an example, and the specific implementation is not limited to this.

Usually, one TA includes multiple cells distributed adjacently.

After receiving the priority information relating to the TA, the terminal will perform cell reselection according to the priority information relating to the TA. In this way, when different TAs are configured with different network slices, the selection can be according to the priority information relating to the TA, which can take network slicing into account. Therefore, during cell reselection of the terminal, the reselection is not only performed according to the cell priority or frequency point priority, so that the reselected cell can reduce the phenomenon that the communication quality is not up to expectations caused by the fact that the cell where the terminal resides cannot provide the network slice required or supported by the terminal, improve the communication quality and reduce unnecessary cell reselection of the terminal.

In some embodiments, the priority information includes:
a first type of priority indication information indicating a first priority relating to the TA; the first priority being the priority of the TA itself.

Here, the first type of priority indication information indicates the priority of the TA. The priority of the TA here is priority information that describes the priority of the TA itself.

In some embodiments, when the TA priority of the first TA is higher than the TA priority of the second TA, the priority of the frequency point supported by the first TA is higher than the priority of the frequency point supported by the second TA.

The higher the priority of the TA is, the higher the priority of the frequency point of the TA is.

The higher the priority of the frequency point, the higher the priority of the network slice supported by the frequency point.

In some embodiments, the priority information includes:
a second type of priority indication information indicating the second priority relating to the TA; the second priority being a combined priority of the TA and the frequency point supported by the TA.

The priority information in embodiments of the present disclosure may also be the second type of priority indication information, and the second type of priority indication information indicates the combined priority of the TA and the frequency point supported by the TA.

The priority indicated by the second type of priority indication information here is the combined priority of the TA and the frequency point supported by the TA, and is positively related to the individual priority of the TA and the individual priority of the frequency point.

Specifically, S120 may include: performing cell reselection according to the priority information relating to the TA, the signal quality of the serving cell, and the signal quality of the neighbor cell. Generally, a cell with high priority and good signal quality is selected as the cell where the terminal resides.

In embodiments of the present application, S120 may include:
when the signal quality of the serving cell of the terminal is greater than the first threshold, determining according to the priority information whether there is a TA to which an inter-frequency cell belongs having the TA priority higher than the TA priority of the TA to which the serving cell of the terminal belongs;
when there is the TA to which the inter-frequency cell belongs having the TA priority higher than that of the TA to which the serving cell of the terminal belongs, performing signal quality measurement of the inter-frequency cell; and
performing the cell reselection according to the result of the signal quality measurement of the inter-frequency cell.

The first threshold here may be a signal threshold.

The signal quality is the cell signal quality, including but not limited to: the received signal strength of the terminal, the received signal power, or the signal to interference plus noise ratio.

If the signal quality of the serving cell is greater than the first threshold, it means that when the terminal performs cell reselection, the signal quality of the serving cell is good, and there is no need to perform cell reselection if it is not necessary. The cell reselection needs to be determined according to the measurement result of the signal quality.

The TA priority here may be: the priority indicated by the first priority indication information or the priority indicated by the second priority indication information.

The inter-frequency cell here includes but is not limited to: an intra-system inter-frequency cell and/or an inter-system inter-frequency cell.

The intra-system inter-frequency cell is a cell that supports a different frequency point in the same communication system.

The same communication system here may be a system using the same communication standard. For example, a 3G system, a 4G system or a 5G system are different communication systems.

Different systems usually use different frequency points, so cells of different systems are all inter-frequency cells.

In some embodiments, the method further includes:
when there is no TA to which the inter-frequency cell belongs having the TA priority higher than the TA priority of the TA to which the serving cell of the terminal belongs, performing no signal quality measurement of the inter-frequency cell.

When there is no neighbor cell with the TA priority higher than the serving cell, the signal quality measurement of the inter-frequency cell is not required, so that unnecessary signal quality measurement of the inter-frequency signal can be reduced.

In some embodiments, S120 may include:
for the reselection in the intra-system inter-frequency cells and the intra-system intra-frequency cells, determining the signal quality of the intra-system inter-frequency cell and the intra-system intra-frequency cell with the same TA priority according to the priority information; and
determining the intra-system inter-frequency cell or the intra-system intra-frequency cell with the highest signal quality as the target cell for cell reselection.

In some cases, the neighbor cells of the serving cell may further include: intra-system intra-frequency cells.

The intra-system intra-frequency cells are cells that support the same frequency point in the same communication system.

In embodiments of the present disclosure, the neighbor cell in the same system is selected preferentially. Therefore, first of all, for the reselection in the intra-system inter-frequency cells and the intra-system inter-frequency cells, when it is determined that the TA priority of the intra-system cell (including the intra-system intra-frequency cell and/or the intra-system inter-frequency cell) is higher than that of the serving cell, the cell with the highest signal quality among the intra-system inter-frequency cells or the intra-system intra-frequency cells will be used as the target cell for cell reselection.

The cell in the same system is given priority for selection as much as possible, which can reduce the frequent handover of the terminal between different communication systems, thereby reducing the problems that are easy to occur between the handover gaps caused by the handover between different systems.

In some embodiments, S120 may include:
for the reselection in the intra-system inter-frequency cells, the intra-system intra-frequency cells, and the inter-system cell, determining according to the priority information whether in the intra-system inter-frequency cells, the intra-system intra-frequency cells, and the inter-system cells, there is the cell with the TA priority higher than the combined priority of the serving cell of the terminal; and
when there is the cell with the TA priority higher than the serving cell of the terminal, the cell with the TA priority higher than the serving cell of the terminal and the signal quality higher than a second threshold is determined as the target cell for cell reselection.

The second threshold here may be equal to the aforementioned first threshold, but is not limited to be equal to the first threshold. For example, the second threshold may be greater or less than the second threshold.

In a case that the second threshold is slightly less than the first threshold, then if there is a neighbor cell with the TA priority higher than the serving cell, even if the signal quality is slightly worse than the serving cell, the corresponding neighbor cell will be given priority to ensure the target cell reselected by the UE can provide the network slice required by the terminal or the network slice supported by the terminal as much as possible.

In some embodiments, performing cell reselection according to the priority information includes:
for the reselection in the intra-system inter-frequency cells, the intra-system intra-frequency cell, and the inter-system cells, determining according to the priority information whether in the intra-system inter-frequency cells, the intra-system intra-frequency cells, and the inter-system cells, there is a cell with the TA priority higher than or equal to the combined priority of the serving cell of the terminal; and
when there is no cell with the TA priority higher than or equal to the serving cell of the terminal, if the signal quality of the serving cell of the terminal is lower than the third threshold, and in the intra-system inter-frequency cells, the intra-system intra-frequency cells and the inter-system cells, there is a cell whose signal quality is higher than a fourth threshold, the cell whose signal quality is higher than the fourth threshold is used as the target cell for cell reselection.

The fourth threshold here may be greater than the third threshold. In this case, if there is a neighbor cell other than the serving cell, for example, the intra-system intra-frequency cell, the intra-system inter-frequency cell, and the inter-system cell having the signal quality higher than the fourth threshold, the cell whose signal quality is higher than the fourth threshold may be used as the target cell for cell reselection.

Of course, the fourth threshold being greater than the third threshold here is only an example, and in specific implementation, it may not be limited that the fourth threshold is greater than the third threshold, and the fourth threshold may also be equal to the third threshold.

In some embodiments, S120 may include:
when the signal quality of the serving cell of the terminal is greater than a fifth threshold, determining according to the priority information whether the TA priority of the intra-system inter-frequency cell and the inter-system cell is higher than the TA priority of the serving cell of the terminal;
when the TA priority of the intra-system inter-frequency cell and the inter-system cell is higher than the TA priority of the serving cell of the terminal, performing the signal quality measurement on the intra-system inter-frequency cell and the inter-system cell; selecting the inter-system inter-frequency cell and the inter-system cell as the target cell for the cell reselection according to the result of the signal quality measurement.

When the signal quality of the serving cell of the terminal is greater than the fifth threshold, it indicates that the service quality of the serving cell is good and stable enough. The fifth threshold here may be equal to any of the first threshold, second threshold, third threshold and fourth threshold described above.

In embodiments of the present disclosure, if the signal quality of the serving cell is greater than the fifth threshold, it is still determined according to the priority information relating to the TA whether there is the intra-system inter-frequency cell and the inter-system cell with the TA priority higher than the TA priority of the serving cell. If yes, there is need to perform signal quality measurement, otherwise signal quality measurement is not performed, thus reducing unnecessary signal quality measurement, and reducing power consumption of the terminal.

In some embodiments, the method further includes:
when the TA priority of the intra-system inter-frequency cell and the inter-system cell is lower than the TA priority of the serving cell of the terminal, performing no signal quality measurement of the intra-system inter-frequency cell or the inter-system cell.

In this way, when the TA priority of the intra-system inter-frequency cell and the inter-system cell is lower than the TA priority of the serving cell, the inter-frequency signal measurement will not be carried out. Such inter-frequency signal measurement includes but is not limited to signal quality measurement of the intra-system inter-frequency cell or the inter-system cell.

Figure 5:
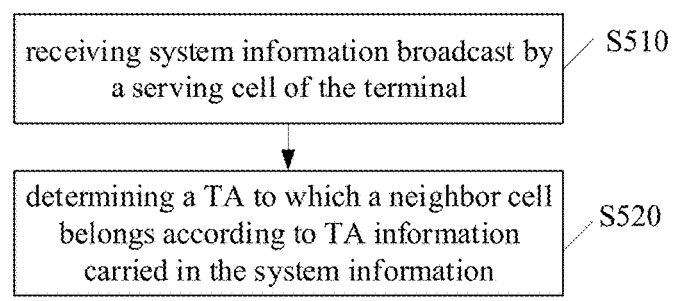
FIG. 5 is a schematic flowchart of a method for cell reselection provided by the present disclosure.

In some embodiments, as shown in FIG. 5, the method further includes:
S510: receiving system information broadcast by a serving cell of the terminal;
S520: determining the TA to which the neighbor cell belongs according to the TA information carried in the system information, wherein the priority information at least indicates the TA priority of the TA to which the adjacent cell belongs.

In embodiments of the present disclosure, the system information broadcast in the serving cell also carries the TA information of the TA to which the neighbor cell belongs, so that the TA of the neighbor cell can be known, so as to facilitate the terminal to determine the priority information of the TA to which the neighbor cell belongs.

In some embodiments, the neighbor cell includes at least one of the intra-system intra-frequency cell, the intra-system inter-frequency cell, and the inter-system cell.

Receiving the system information broadcast by the serving cell of the terminal includes at least one of:

receiving intra-system intra-frequency cell reselection information broadcast by the serving cell, wherein the intra-system intra-frequency cell reselection information carries the TA information of the intra-system intra-frequency cell;

receiving intra-system inter-frequency cell reselection information broadcast by the serving cell, wherein the intra-system inter-frequency cell reselection information carries the TA information of the intra-system inter-frequency cell;

receiving inter-system cell reselection information broadcast by the serving cell, wherein the inter-system cell reselection information carries the TA information of the inter-system cell.

The TA information here may indicate the TA to which the neighbor cell belongs.

The TA information includes but is not limited to a TA identifier.

In some embodiments, performing cell reselection according to the priority information includes:

according to the priority information, determining that the intra-system inter-frequency cell corresponding to the TA information carried in the system information is a candidate cell for cell reselection;

and/or, according to the priority information, determining that the inter-system cell corresponding to the TA information carried in the system information is a candidate cell for cell reselection.

Of course, in some embodiments, performing cell reselection according to the priority information includes: determining, according to the priority information, that the intra-system intra-frequency cell corresponding to the system information carrying the TA information is the candidate cell for cell reselection.

In other embodiments, during cell reselection, the intra-system intra-frequency cell is a candidate cell for cell reselection by default.

In embodiments of the present disclosure, reselection needs to be performed in which neighbor cells according to the priority information relating to the TA in the present disclosure need to be determined based on the TA information of the TA to which neighbor cells belong carried in the system information. If the TA information of the TA to which a certain neighbor cell belongs is not carried in the system information of the serving cell, the cell reselection can be performed according to the frequency point priority or the cell priority instead of the TA priority information in embodiments of the present disclosure.

Which cells are used as candidate cells for cell reselection based on TA priority information are determined based on the intra-system intra-frequency cells, intra-system inter-frequency cells, and inter-system cells whose slice information is carried in the system information sent by the serving cell, thereby reducing the reselection to inappropriate cells caused by cell reselection in all cells.

In some embodiments, the method further includes:

receiving a first indication sent by the serving cell of the terminal; wherein the first indication is configured to indicate whether the system information broadcast in the serving cell of the terminal can carry the TA information.

Determining the TA to which the neighbor cell belongs according to the TA information carried in the system information includes:

when the first indication is received and the system information does not carry the TA information of the neighbor cell, determining that the neighbor cell and the serving cell of the terminal belong to the same TA.

Even if the terminal receives the first indication, the system information received in the serving cell may or may not carry the TA information. If the first indication is received and the TA information is not carried, it is determined that the network slice supported by the frequency point of the neighbor cell is the same as the network slice supported by the frequency point of the serving cell. If the system information carries the TA information, the TA information of the network slice supported by the frequency point of the neighbor cell is determined according to the TA information.

In some embodiments, the method further includes:

receiving a second indication sent by the serving cell of the terminal, wherein the second indication is configured to indicate that the serving cell of the terminal and the TA the neighbor cell belong to different TAs;

when the first indication is received, the second indication is not received, and the system information does not carry the TA information of the neighbor cell, determining that the neighbor cell and the serving cell of the terminal belong to the same TA.

In some embodiments, the second indication is also broadcast within the serving cell. The second indication is information configured to indicate whether the TA to which the serving cell belongs is different from the TA to which the neighbor cell belongs.

If the first indication is received, the second indication is not received, and the system information does not carry the TA information of the neighbor cell, it is determined that the network slice supported by the frequency point of the neighbor cell is same as the network slice supported by the frequency point of the serving cell of the terminal.

In some embodiments, when the second indication is not received, it may be determined by default that the network slice supported by the frequency point of the neighbor cell is the same as the network slice supported by the frequency point of the serving cell. In some embodiments, both the first indication and/or the second indication may contain only 1 bit, and may be broadcast in different time information.

In some embodiments, receiving the priority information relating to the tracking area (TA) includes:

receiving the priority information at the TAU or RAU of the terminal.

The priority information is received during the tracking area update (TAU) or a radio network notification area update (RAU) of the terminal.

The update TAU involves the update of the area where the core network is located, and the update RAU involves the update of the area where the radio network is located. Generally speaking, the Tracking Area (TA) corresponding to the TAU is greater than the Notification Area (NA) corresponding to the RAU.

At the time of TAU or RAU, the priority information is received, so that when cell reselection is involved in the TA or notification area, the priority information can be used to implement cell reselection.

For example, the priority information is carried in a completion message or confirmation message of the TAU or RAU. In this way, when the terminal receives the completion message or confirmation message of the TAU or RAU, the receiving of the priority information is completed.

In some embodiments, receiving the priority information relating to the TA includes:

when the terminal releases the radio resource control (RRC) connection, receiving the RRC release information carrying the priority information.

When the terminal releases the radio resource control (RRC) connection, the terminal receives RRC release information carrying the first priority information.

In some embodiments, the terminal releases the RRC connection through the RRC connection release message to exit the connected state and enter the idle state or the inactive state. In this way, when entering the connected state again, cell reselection will be performed, so that the cell selection associated with the network slice may be performed in time according to the first priority information carried in the RRC connection release message.

In embodiments of the present application, the priority information relating to the TA is not sent through special information, but is received by using the information used in the existing process, which has strong compatibility with the existing technology and reduces unnecessary reception by the terminal. Moreover, the priority information received in the TAU, RAU and connection release messages can be used immediately in the next cell reselection, thereby reducing delays.

Figure 6:
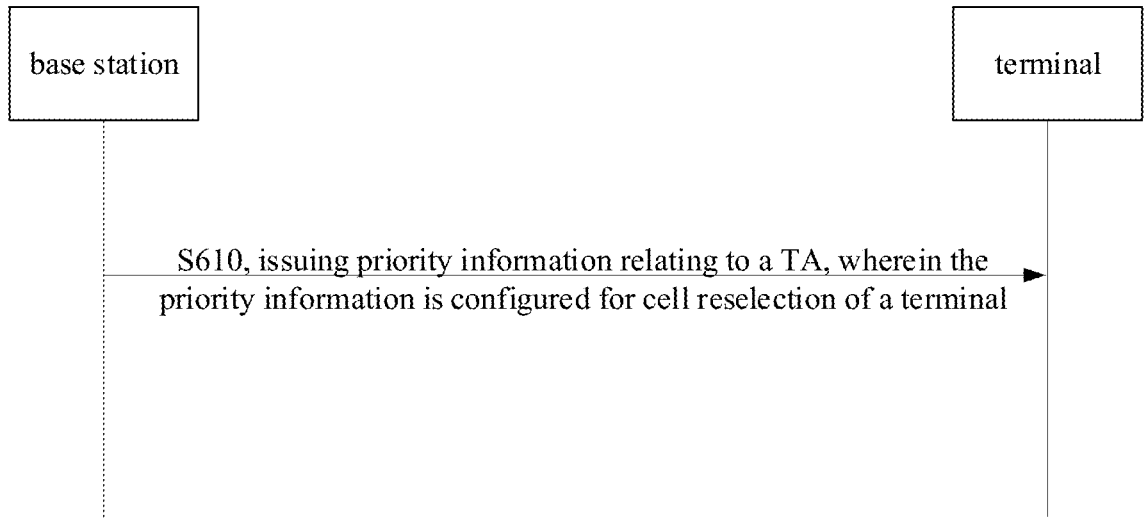
FIG. 6 is a schematic flowchart of a method for cell reselection provided by the present disclosure.

As shown in FIG. 6, this embodiment provides a method for information transmission. The method is applied to a base station, and includes:

S610: issuing priority information relating to a TA, wherein the priority information is configured for cell reselection of a terminal.

The base station in this embodiment of the present disclosure may be a 3G base station, a 4G base station, or a 5G base station, or any later-generation base station after the 5G base station.

In this embodiment of the present disclosure, the base station issues the priority information relating to the TA, and after the priority information relating to the TA is issued to the terminal, the terminal can perform cell reselection.

In embodiments of the present disclosure, the priority information relating to the TA here may be the priority information of UE granularity, that is, the priority information received by different terminals is different.

In some embodiments, the priority information includes:
the first type of priority indication information indicating the first priority; the first priority being the priority of the TA itself.

In some embodiments, when the TA priority of the first TA is higher than the TA priority of the second TA, the priority of the frequency point supported by the first TA is higher than the priority of the frequency point supported by the second TA.

When the TA priority of a TA is higher, the priority of the frequency point supported by the TA is also higher.

In some embodiments, the priority information includes:
the second type of priority indication information indicating the second priority; the second priority being the combined priority of the TA and the frequency point supported by the TA.

The priority indicated by the second type of priority indication information is the combined priority of the TA and the frequency point supported by the TA.

In some embodiments, the method further includes:
broadcasting a first indication in the serving cell, wherein the first indication is configured to indicate whether the system information broadcast in the serving cell of the terminal can carry the TA information.

In embodiments of the present disclosure, the first indication is broadcast in the serving cell, and the first indication informs whether the system information of the serving cell of the terminal will carry the TA information of the neighbor cell.

For example, issuing the priority information relating to the TA includes:
according to the first indication, issuing the system information carrying the TA information when the TA to which the serving cell of the terminal belongs is different from the TA to which the neighbor cell belongs. The priority information at least indicates the TA priority of the TA corresponding to the broadcasted TA information.

The serving cells corresponding to terminals residing in different cells are different.

If the TA to which the serving cell belongs is different from the TA to which the neighbor cell belongs, the TA information may be carried by the system information to specifically indicate the TA to which the neighbor cell belongs.

If the serving cell and the neighbor cell belong to the same TA, the TA information may not be carried in the system information, thereby reducing the bit overhead of the system information in the serving cell.

In some embodiments, issuing the system information carrying the TA information includes:
broadcasting intra-system intra-frequency cell reselection information in the serving cell, wherein the intra-system intra-frequency cell reselection information carries the TA information of the intra-system intra-frequency cell;
broadcasting intra-system inter-frequency cell reselection information in the serving cell, wherein the intra-system inter-frequency cell reselection information carries the TA information of the intra-system inter-frequency cell;
broadcasting inter-system cell reselection information in the serving cell, wherein the inter-system cell reselection information carries the TA information of the inter-system cell.

In some embodiments, the intra-system intra-frequency cell reselection information includes but is not limited to a system information block (SIB) 3. The intra-system inter-frequency cell reselection information may include but is not limited to SIB4. The inter-system cell reselection information includes but is not limited to SIB5.

In some embodiments, issuing the priority information relating to the TA includes:
according to the first indication, carrying no TA information in the system information when the serving cell of the terminal and the neighbor cell belong to the same TA. The priority information at least indicates the TA priority of the TA to which the neighbor cell belongs.

In some embodiments, the method further includes:
broadcasting a second indication in the serving cell, wherein the second indication is configured to indicate that the TA to which the serving cell of the terminal belongs is different from the TA to which the neighbor cell belongs; the system information is configured to carry the TA information after the first indication and the second indication are broadcasted.

In some embodiments, S610 may include: in the TAU or RAU of the terminal, issuing the priority information.

The priority information is issued in the process of TAU and RAU, instead of using dedicated signaling to issue the priority information, which is compatible with related technologies and saves signaling overhead.

In other embodiments, S610 may include: when the terminal releases the RRC connection, issuing RRC release information carrying the priority information.

When the terminal releases the RRC connection and switches from the connected state to the idle state or the inactive state, the terminal receives the RRC release message, and the first priority information can be obtained from the RRC release message.

Figure 7:
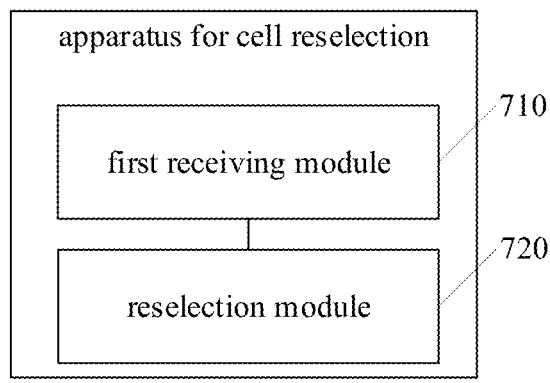
FIG. 7 is a block diagram of an apparatus for cell reselection provided by an embodiment of the present disclosure.

As shown in FIG. 7, this embodiment provides an apparatus for cell reselection. The apparatus is applied to a terminal, and includes:
- a first receiving module 710, configured to receive priority information relating to a tracking area (TA); and
- a reselection module 720 configured to perform cell reselection according to the priority information.

In some embodiments, the first receiving module 710 and the reselection module 720 may be program modules, and the program modules can receive first priority information and perform cell reselection after being executed by the processor.

In some embodiments, the first receiving module 710 and the reselection module 720 may be a combination of software and hardware; the combination of software and hardware may include various programmable arrays; the programmable arrays include, but are not limited to, complex programmable arrays or field programmable arrays.

In still other embodiments, the first receiving module 710 and the reselection module 720 may further include pure hardware modules. The pure hardware module may include an application specific integrated circuit.

In some embodiments, the priority information includes:
the first type of priority indication information indicating the first priority; the first priority being the priority of the TA itself.

In some embodiments, when the TA priority of the first TA is higher than the TA priority of the second TA, the priority of the frequency point supported by the first TA is higher than the priority of the frequency point supported by the second TA.

In some embodiments, the priority information includes:
the second type of priority indication information indicating the second priority relating to the TA; the second priority being the combined priority of the TA and a frequency point supported by the TA.

In some embodiments, the reselection module 720 is configured to, when the signal quality of the serving cell of the terminal is greater than the first threshold, determine, according to the priority information, whether there is a TA to which an inter-frequency cell belongs having a TA priority higher than a TA priority of the serving cell of the terminal according to the priority information; when there is the TA to which the inter-frequency cell belongs having the TA priority higher than the TA priority of the TA to which the serving cell of the terminal belongs, perform signal quality measurement of the inter-frequency cell; and perform the cell reselection according to a result of the signal quality measurement of the inter-frequency cell.

In some embodiments, the apparatus further includes:
a first measurement module, configured to, when there is no TA to which the inter-frequency cell belongs having the TA priority higher than the TA priority of the TA to which the serving cell of the terminal belongs, perform no signal quality measurement of the inter-frequency cell.

In some embodiments, the reselection module 720 is configured to, for reselection in intra-system inter-frequency cells and intra-system intra-frequency cells, determine a signal quality of the intra-system inter-frequency cell or the intra-system intra-frequency cell with the same TA priority according to the priority information; determine the intra-system inter-frequency cell or the intra-system intra-frequency cell with the highest signal quality as a target cell for cell reselection.

In some embodiments, the reselection module 720 is configured to: for reselection in intra-system inter-frequency cells, intra-system intra-frequency cells, and inter-system cells, determine according to the priority information whether in the intra-system inter-frequency cells, the intra-system intra-frequency cells, and the inter-system cells, there is a cell with a TA priority higher than a TA priority of a serving cell of the terminal; when there is a cell with the TA priority higher than the TA priority of the serving cell of the terminal, determine a cell with the TA priority higher than the TA priority of the serving cell of the terminal and a signal quality higher than a second threshold as a target cell for cell reselection.

In some embodiments, the reselection module 720 is configured to: for reselection in intra-system inter-frequency cells, intra-system intra-frequency cells, and inter-system cells, determine according to the priority information whether in the intra-system inter-frequency cells, the intra-system intra-frequency cells, and the inter-system cells, there is a cell with a TA priority higher than or equal to a TA priority of a serving cell of the terminal; when there is no cell with the TA priority higher than or equal to the TA priority of the serving cell of the terminal, if a signal quality of the serving cell of the terminal is lower than a third threshold, and in the intra-system inter-frequency cells, the intra-system intra-frequency cells and the inter-system cells, there is a cell with a signal quality higher than a fourth threshold, determine the cell with the signal quality higher than the fourth threshold as a target cell for cell reselection.

In some embodiments, the reselection module 720 is configured to: when a signal quality of a serving cell of the terminal is greater than a fifth threshold, determine according to the priority information whether a TA priority of an intra-system inter-frequency cell and an inter-system cell is higher than a TA priority of the serving cell of the terminal; when the TA priority of the intra-system inter-frequency cell and the inter-system cell is higher than the TA priority of the serving cell of the terminal, perform signal quality measurement of the intra-system inter-frequency cell and the inter-system cell; select the intra-system inter-frequency cell or the inter-system cell as a target cell for cell reselection according to a result of the signal quality measurement.

In some embodiments, the apparatus further includes:
a second measurement module, configured to, when the TA priority of the intra-system inter-frequency cell and the inter-system cell is lower than the TA priority of the serving cell of the terminal, perform no signal quality measurement of the intra-system inter-frequency cell or the inter-system cell.

In some embodiments, the first receiving module 710 is further configured to receive system information broadcast by a serving cell of the terminal;

The device further includes:
a determining module, configured to determine a TA to which a neighbor cell belongs according to TA information carried in the system information, wherein the priority information at least indicates a TA priority of the TA to which the neighbor cell belongs.

In some embodiments, the neighbor cell includes at least one of: an intra-system intra-frequency cell, an intra-system inter-frequency cell, and an inter-system cell.

The first receiving module 710 is configured to receive the system information broadcast by the serving cell of the terminal by at least one of followings:

receiving intra-system intra-frequency cell reselection information broadcast by the serving cell, wherein the intra-system intra-frequency cell reselection information carries TA information of the intra-system intra-frequency cell;

receiving intra-system inter-frequency cell reselection information broadcast by the serving cell, wherein the intra-system inter-frequency cell reselection information carries TA information of the intra-system inter-frequency cell;

receiving inter-system cell reselection information broadcast by the serving cell, wherein the inter-system cell reselection information carries TA information of the inter-system cell.

In some embodiments, the reselection module 720 is configured to: determine according to the priority information that the intra-system inter-frequency cell corresponding to the TA information carried in the system information is a candidate cell for cell reselection;

and/or, determine according to the priority information that the inter-system cell corresponding to the TA information carried in the system information is a candidate cell for cell reselection.

In some embodiments, the first receiving module 710 is further configured to receive a first indication sent by the serving cell of the terminal; wherein the first indication is configured to indicate whether the system information broadcast in the serving cell of the terminal can carry the TA information.

The determining module is configured to, when the first indication is received and the system information carries no TA information of the neighbor cell, determine that the neighbor cell and the serving cell of the terminal belong to a same TA.

In some embodiments, the first receiving module 710 is configured to receive a second indication sent by the serving cell of the terminal, where the second indication is configured to indicate that a TA to which the serving cell of the terminal belongs is different from the TA to which the neighbor cell belongs.

The determining module is configured to, when the first indication is received, the second indication is not received, and the system information carries no TA information of the neighbor cell, determine that the neighbor cell and the serving cell of the terminal belong to the same TA.

In some embodiments, the first receiving module 710 is configured to receive the priority information in a tracking area update (TAU) or a radio access network notification area update (RAU) of the terminal.

In some embodiments, the first receiving module 710 is configured to, when the terminal releases a radio resource control (RRC) connection, receive RRC release information carrying the priority information.

Figure 8:
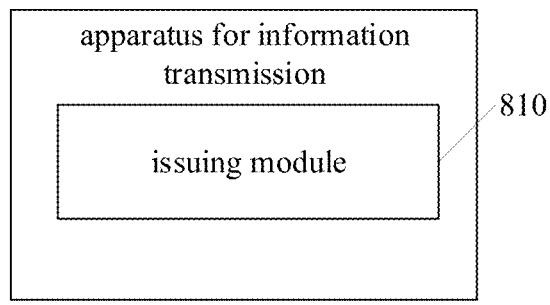
FIG. 8 is a block diagram of an apparatus for information transmission provided by an embodiment of the present disclosure.

As shown in FIG. 8, this embodiment provides an apparatus for information transmission. The apparatus is applied to a base station, and includes:

an issuing module 810, configured to issue priority information relating to a TA, wherein the priority information is configured for cell reselection of a terminal.

In some embodiments, the issuing module 810 may be a program module, and the program module can issue the first priority information after being executed by the processor.

In some embodiments, the issuing module 810 may be a software-hardware combination module; the software-hardware combination module may include various programmable arrays; the programmable arrays include but are not limited to complex programmable array or field programmable array.

In still other embodiments, the issuing module 810 may further include a pure hardware module. The pure hardware module may include an application specific integrated circuit.

In some embodiments, the priority information includes:

a first type of priority indication information indicating a first priority relating to the TA, wherein the first priority is a priority of the TA itself.

In some embodiments, when a TA priority of the first TA is higher than a TA priority of a second TA, a priority of a frequency point supported by the first TA is higher than a priority of a frequency point supported by the second TA.

In some embodiments, the priority information includes:

a second type of priority indication information indicating a second priority relating to the TA, wherein the second priority is a combined priority of the TA and a frequency point supported by the TA.

In some embodiments, the apparatus further includes:

a broadcasting module, configured to broadcast a first indication in a serving cell, wherein the first indication is configured to indicate whether system information broadcast in the serving cell of the terminal can carry TA information. The priority information at least indicates a TA priority of the TA corresponding to the broadcasted TA information.

In some embodiments, the issuing module 810 is configured to, according to the first indication, issue the system information carrying the TA information when a TA to which the serving cell of the terminal is different from a TA to which a neighbor cell belongs.

In some embodiments, the issuing module 810 is configured to: broadcast intra-system intra-frequency cell reselection information in the serving cell of the terminal, wherein the intra-system intra-frequency cell reselection information carries TA information of an intra-system intra-frequency cell; broadcast intra-system inter-frequency cell reselection information in the serving cell of the terminal, wherein the intra-system inter-frequency cell reselection information carries TA information of an intra-system inter-frequency cell; broadcast inter-system cell reselection information broadcast in the serving cell of the terminal, wherein the inter-system cell reselection information carries TA information of an inter-system cell.

In some embodiments, the issuing module 810 is configured to, according to the first indication, carry no TA information in the system information when the serving cell of the terminal and the neighbor cell belong to a same TA.

In some embodiments, the broadcasting module is further configured to broadcast a second indication in the serving cell of the terminal, wherein the second indication is configured to indicate that the TA to which the serving cell of the terminal belongs is different from the TA to which the neighbor cell belongs. The system information is configured to carry the TA information after the first indication and the second indication are broadcasted.

In some embodiments, the issuing module 810 is configured to issue the priority information in a TAU or a RAU of the terminal.

In some embodiments, the issuing module 810 is configured to, when the terminal releases an RRC connection, issue the priority information carrying RRC release information.

One or more examples are provided below in conjunction with any of the above-described embodiments:

The UE receives the TA (Tracking Area) priority issued by the base station through dedicated signaling.

The priority of the TA may also include: the combined priority of the frequency point supported by the TA and the TA. The UE determines the priority in cell reselection based on the priority information of the TA or the priority information of the combination of the TA and the frequency point, and then performs cell reselection.

According to the priority information of the TA, the priority of the TA can be obtained, for example, TA1>TA2>TA3. The priority information of the combination of TA and frequency point can be obtained, for example, TA1+f1>TA2+f1=TA1+f2>TA2+f2. The priority of the combination of TA and the frequency point supported by TA can be obtained, for example, TA3>TA1 f1>TA2 f2>TA1 f2>TA2 f1>f3. In this example, if only the TA is indicated without the corresponding frequency point, such as TA3, it means that it is applicable to all the frequency points under the TA; if only the frequency point is indicated without the corresponding TA, such as f3, it means that the priority of the frequency point does not need to consider the TA factor.

In some cases, for intra-system intra-frequency cell (intra-freq) and intra-system inter-frequency cell (inter-freq) reselection, for cells with the same freq+TA priority, the UE sorts the cells according to the signal quality and then perform cell reselection. The freq+TA priority is the priority of the TA and the frequency point supported by the TA in the TA priority in the foregoing embodiment.

In some cases, for intra-freq, inter-freq and inter-RAT cell reselection, if the freq+TA priority is higher than the freq+TA priority of the serving cell, if there is a cell under the freq+TA whose signal quality is higher than a certain threshold, the UE reselects to this freq+TA (the corresponding TA indicated by freq+TA and the frequency point freq supported by the TA). One TA may support one or more frequency points. The priorities of the same TA combined with different frequency points may be the same or different.

In some cases, for intra-freq, inter-freq and inter-RAT cell reselection, if the freq+TA priority is lower than the freq+TA priority of the serving cell, if the signal quality of the serving cell is less than a certain threshold, and there is a cell under freq+TA whose signal quality is higher than a certain threshold, the UE reselects to the freq+TA.

In some cases, the UE receives the TA information of the frequency point and/or the neighbor cell of the frequency point broadcast by the serving cell, and the UE uses this information to determine the TA corresponding to the frequency point and/or the neighbor cell of the frequency point when performing cell reselection.

For intra-system intra-frequency cells, for example, the TA corresponding to the neighbor cell is indicated in the intra-system intra-frequency cell list (intraFreqNeighCell-List) of the SIB3.

For intra-system inter-frequency cells, for example, the TA corresponding to the frequency point (freq) is indicated in the intra-system inter-frequency cell information (Inter-FreqCarrierFreqInfo) of SIB4, or the TA corresponding to the neighbor cell is indicated in the intra-system inter-frequency cell information (InterFreqCarrierFreqInfo) of the intra-system inter-frequency cell carrier frequency information (interFreqNeighCellInfo). The indicated TA corresponding to the freq indicates that the TAs of all neighbor cells under the freq are the same.

For inter-RAT, for example, the TA corresponding to the freq is indicated in the carrier frequency information (CarrierFreqEUTRA) of SIB5, or the TA corresponding to the neighbor cell is indicated in the neighbor cell frequency point information (EUTRA-FreqNeighCellInfo) of Carrier-FreqEUTRA.

The UE can obtain the neighbor cell of the TA through the system information, and the UE does not need to obtain the TA by reading the system information of the neighbor cell.

The UE performs inter-freq/inter-RAT cell reselection only on the frequency points broadcast by the system.

In some cases, if the signal quality of the serving cell is greater than a certain threshold, and the intra-freq neighbor cells and its corresponding TA indicated in the system information do not have neighbor cells with higher priority than the serving cell and its corresponding TA, the UE may not perform intra-freq measurement; otherwise, the UE needs to perform intra-freq measurement.

In some cases, if the signal quality of the serving cell is greater than a certain threshold, for the inter-freq or inter-RAT frequency point indicated in the system information and the corresponding TA, if there is no other frequency point and its corresponding TA whose priority is higher than the priority of the corresponding frequency point+TA of the serving cell, the UE may not perform inter-freq or inter-RAT measurement on the frequency point.

In some cases, the UE receives an indication broadcast by the base station about whether broadcasting TA is supported, and the UE determines the TA corresponding to the neighbor cell of the frequency point and/or the frequency point through the indication and whether there is TA information indicated in the frequency point and/or the neighbor cell of the frequency point.

In some cases, if the base station broadcasts an indication to support broadcasting TA, if the frequency point indicated in the system information (if the neighbor cell is not indicated in the frequency point) does not indicate the corresponding TA, or neither the neighbor cell of the frequency point or the frequency point indicated in the system information indicates the corresponding TA, it is considered that the frequency point or the neighbor cell has the same TA as the serving cell.

In some cases, if the base station broadcasts an indication that broadcasting TA is not supported, the UE cannot determine the TA of the frequency point and the neighbor cell through the system information.

In some cases, when the UE is in TAU/RAU, the network sends updated TA (Tracking Area) priority or priority information of the combination of TA and frequency point.

The update may be sent via an RRC release message.

In some cases, the UE receives an indication broadcast by the base station about whether there is a neighbor cell whose TA is different from the TA of the serving cell. If the indication does not exist, the UE considers all neighbor cells belong to the same TA as the serving cell. If the indication exists, if the frequency point indicated in the system information (if the neighbor cell is not indicated in the frequency point) does not indicate the corresponding TA, or the neighbor cell of the frequency point and/or frequency point indicated in the system information does not indicate the corresponding TA, it is considered that the frequency point or the neighbor cell has the same TA as the serving cell.

In some cases, if the base station does not broadcast an indication of whether there is a neighbor cell whose TA is different from the TA of the serving cell, the UE cannot determine the TA of the frequency point and the neighbor cell through the system information.

Figure 9:
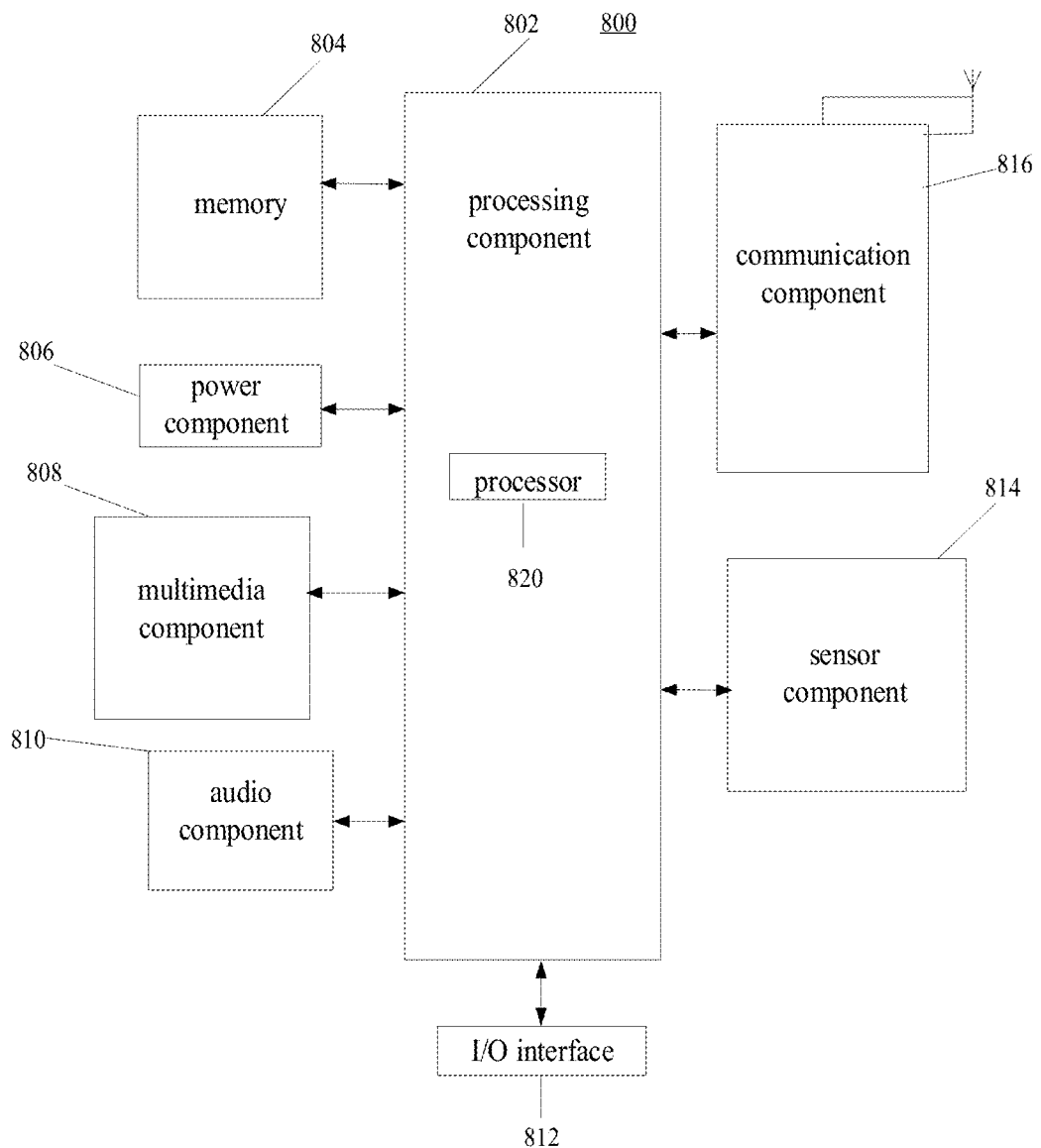
FIG. 9 is a schematic diagram of a terminal provided by an embodiment of the present disclosure.

Referring to the terminal 800 shown in FIG. 9, this embodiment provides a terminal 800. The terminal specifically may be a mobile phone, a computer, a digital broadcasting terminal, a messaging transceiver, a game console, a tablet device, a medical equipment, a fitness equipment, a personal digital assistant, etc.

Referring to FIG. 9, the terminal 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the terminal 800, such as the operations associated with display, data communications, telephone call, camera operations, and recording operations. The processing component 802 may include one or more processors Z20 to execute instructions so as to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, videos, etc. The memory 804 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input an audio signal. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an opened/closed status of the terminal 800, relative positioning of components (e.g., the display and the keypad) of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the terminal 800 and other apparatus. The terminal 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, there is also provided a non-transitory computer-readable storage medium including instructions, such as a memory 804 including instructions, which are executable by the processor 820 of the terminal 800 to perform the above method. For example, the non-transitory computer-readable storage medium may be ROM, random access memory (RAM), CD-ROM, magnetic tape, floppy disk, optical data storage device, and the like.

Figure 10:
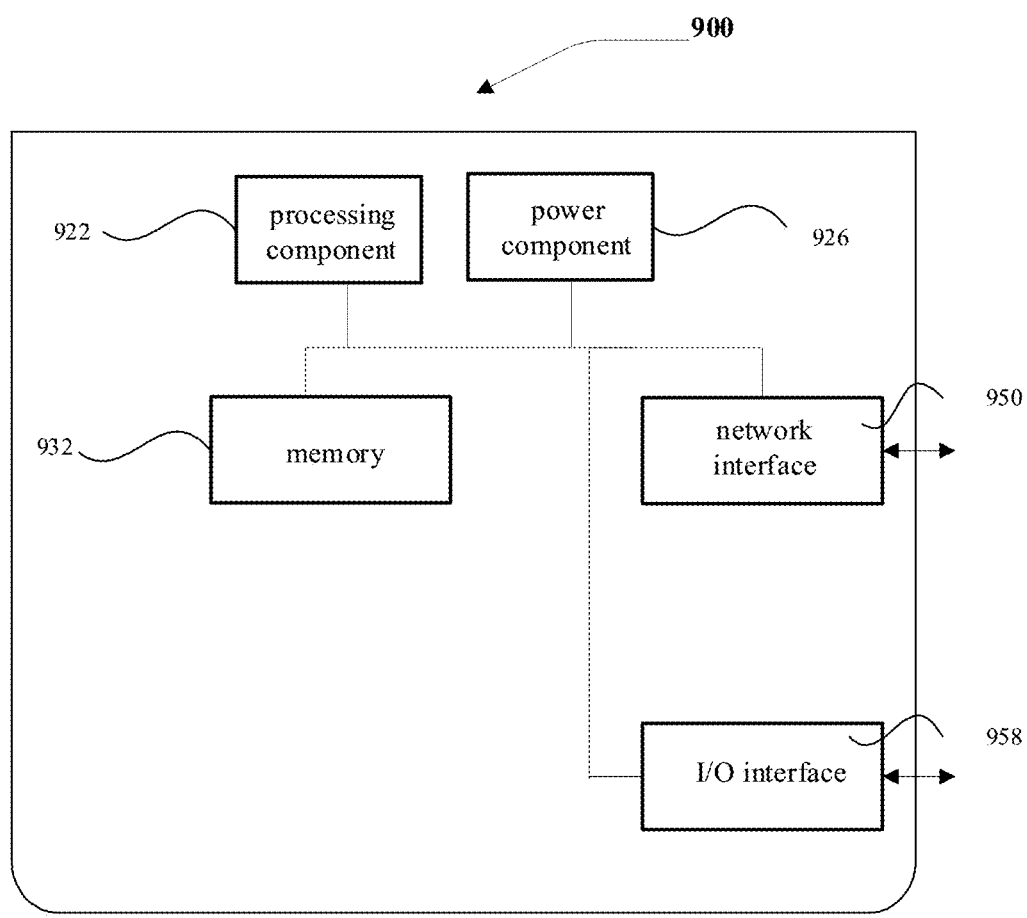
FIG. 10 is a schematic diagram of a base station provided by an embodiment of the present disclosure.

FIG. 10 is a block diagram of a base station 900 according to an exemplary embodiment. For example, the base station 900 may be provided as a network-side device. Referring to FIG. 10, the base station 900 includes a processing component 922, which further includes one or more processors, and a memory resource represented by a memory 932 for storing instructions executable by the processing component 922, such as application programs. The application programs stored in the memory 932 may include one or more modules, each corresponding to a set of instructions. In addition, the processing component 922 is configured to execute the instructions to execute the cell reselection method or the information transmission method provided by any of the foregoing embodiments of the above method, for example, the method shown in FIG. 4, FIG. 5 and/or FIG. 6.

The base station 900 may further include a power component 926 configured to perform power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

The wireless network interface 950 includes, but is not limited to, the antenna of the aforementioned communication device. Other embodiments of the present application will readily occur to those skilled in the art upon consideration of the specification and practice of the invention disclosed herein. This application is intended to cover any variations, uses, or adaptations of the present application that follow the general principles of the present application and include common knowledge or conventional techniques in the art not disclosed by this disclosure. The specification and examples are to be regarded as exemplary only, with the true scope and spirit of the application being indicated by the following claims.

It is to be understood that the present application is not limited to the precise structures described above and illustrated in the accompanying drawings and that various modifications and changes may be made without departing from the scope thereof. The scope of the application is limited only by the appended claims.

What is claimed is:

1. A method for cell reselection, comprising:
   receiving, by a terminal, system information broadcast by a serving cell of the terminal;
   determining, by the terminal, a tracking area (TA) according to TA information carried in the system information;
   receiving, by the terminal, priority information, wherein the priority information comprises a combined priority of the TA and a frequency point, the combined priority of the TA and the frequency point refers to a priority set based on a combination of the TA and the frequency point; and
   performing, by the terminal, cell reselection according to the priority information.

2. The method of claim 1, wherein the priority information comprises:
   a first type of priority indication information indicating a first priority relating to the TA, wherein the first priority is a priority of the TA itself.

3. The method of claim 2, wherein in response to a TA priority of a first TA being higher than a TA priority of a second TA, a priority of a frequency point supported by the first TA is higher than a priority of a frequency point supported by the second TA.

4. The method of claim 1, wherein the priority information comprises:
   a second type of priority indication information indicating a second priority relating to the TA, wherein the second priority is a combined priority of the TA and a frequency point supported by the TA.

5. The method of claim 1, wherein performing the cell reselection according to the priority information comprises:
   in response to a signal quality of a serving cell of the terminal being greater than a first threshold, determining whether there is a TA to which an inter-frequency cell belongs having a TA priority higher than a TA priority of the serving cell of the terminal according to the priority information;
   in response to determining that there is the TA to which the inter-frequency cell belongs having the TA priority higher than the TA priority of the TA to which the serving cell of the terminal belongs, performing signal quality measurement of the inter-frequency cell; and
   wherein performing the cell reselection according to a result of the signal quality measurement of the inter-frequency cell further comprising:
   in response to determining that there is no TA to which the inter-frequency cell belongs having the TA priority higher than the TA priority of the TA to which the serving cell of the terminal belongs, performing no signal quality measurement of the inter-frequency cell.

6. The method of claim 1, wherein performing the cell reselection according to the priority information comprises:
   for reselection in intra-system inter-frequency cells and intra-system intra-frequency cells, determining a signal quality of the intra-system inter-frequency cell or the intra-system intra-frequency cell with the same TA priority according to the priority information; and
   determining the intra-system inter-frequency cell or the intra-system intra-frequency cell with the highest signal quality as a target cell for cell reselection.

7. The method of claim 1, wherein performing the cell reselection according to the priority information comprises:
   for reselection in intra-system inter-frequency cells, intra-system intra-frequency cells, and inter-system cells, determining, according to the priority information, whether any of the intra-system inter-frequency cells, the intra-system intra-frequency cells, or the inter-system cells includes a cell with a combined priority of the TA and the frequency point higher than a combined priority of the TA and the frequency point of a serving cell of the terminal; and
   in response to determining that the cell with the combined priority of the TA and the frequency point higher than the combined priority of the TA and the frequency point of the serving cell of the terminal exists, determining the cell with the combined priority of the TA and the frequency point higher than the combined priority of the TA and the frequency point of the serving cell of the terminal and a signal quality higher than a second threshold as a target cell for cell reselection.

8. The method of claim 1, wherein performing the cell reselection according to the priority information comprises:
   for reselection in intra-system inter-frequency cells, intra-system intra-frequency cells, and inter-system cells, determining according to the priority information whether in the intra-system inter-frequency cells, the intra-system intra-frequency cells, and the inter-system cells, there is a cell with a TA priority higher than or equal to a TA priority of a serving cell of the terminal; and
   in response to determining that there is no cell with the TA priority higher than or equal to the TA priority of the serving cell of the terminal, and in response to a signal quality of the serving cell of the terminal being lower than a third threshold, and in the intra-system inter-frequency cells, the intra-system intra-frequency cells and the inter-system cells, there being a cell with a signal quality higher than a fourth threshold, determining the cell with the signal quality higher than the fourth threshold as a target cell for cell reselection.

9. The method of claim 1, wherein performing the cell reselection according to the priority information comprises:
in response to a signal quality of a serving cell of the terminal being greater than a fifth threshold, determining according to the priority information whether a TA priority of an intra-system inter-frequency cell and an inter-system cell is higher than a TA priority of the serving cell of the terminal;
in response to the TA priority of the intra-system inter-frequency cell and the inter-system cell being higher than the TA priority of the serving cell of the terminal, performing signal quality measurement of the intra-system inter-frequency cell and the inter-system cell; and
wherein selecting the intra-system inter-frequency cell or the inter-system cell as a target cell for cell reselection according to a result of the signal quality measurement further comprising:
in response to the TA priority of the intra-system inter-frequency cell and the inter-system cell being lower than the TA priority of the serving cell of the terminal, performing no signal quality measurement of the intra-system inter-frequency cell or the inter-system cell.

10. The method of claim 1, further comprising:
determining a TA to which a neighbor cell belongs according to TA information carried in the system information, wherein the priority information at least indicates a TA priority of the TA to which the neighbor cell belongs,
wherein the neighbor cell comprises at least one of: an intra-system intra-frequency cell, an intra-system inter-frequency cell, and an inter-system cell;
receiving the system information broadcast by the serving cell of the terminal comprises at least one of followings:
receiving intra-system intra-frequency cell reselection information broadcast by the serving cell, wherein the intra-system intra-frequency cell reselection information carries TA information of the intra-system intra-frequency cell;
receiving intra-system inter-frequency cell reselection information broadcast by the serving cell, wherein the intra-system inter-frequency cell reselection information carries TA information of the intra-system inter-frequency cell;
receiving inter-system cell reselection information broadcast by the serving cell, wherein the inter-system cell reselection information carries TA information of the inter-system cell,
wherein performing the cell reselection according to the priority information comprises:
determining according to the priority information that the intra-system inter-frequency cell corresponding to the TA information carried in the system information is a candidate cell for cell reselection; or
determining according to the priority information that the inter-system cell corresponding to the TA information carried in the system information is a candidate cell for cell reselection.

11. The method of claim 10, further comprising:
receiving a first indication sent by the serving cell of the terminal; wherein the first indication is configured to indicate whether the system information broadcast in the serving cell of the terminal can carry the TA information;
determining the TA to which the neighbor cell belongs according to the TA information carried in the system information comprises:
in response to the first indication being received and the system information carrying no TA information of the neighbor cell, determining that the neighbor cell and the serving cell of the terminal belong to a same TA.

12. The method of claim 11, further comprising:
receiving a second indication sent by the serving cell of the terminal, wherein the second indication is configured to indicate that a TA to which the serving cell of the terminal belongs is different from the TA to which the neighbor cell belongs;
in response to the first indication being received and the system information carrying no TA information of the neighbor cell, determining that the neighbor cell and the serving cell of the terminal belong to the same TA, comprises:
in response to the first indication being received, the second indication being not received, and the system information carrying no TA information of the neighbor cell, determining that the neighbor cell and the serving cell of the terminal belong to the same TA.

13. The method of claim 1, wherein receiving the priority information relating to the TA comprises:
receiving the priority information in a tracking area update (TAU) or a radio access network notification area update (RAU) of the terminal.

14. The method of claim 1, wherein receiving the priority information relating to the TA comprises:
receiving radio resource control (RRC) release information carrying the priority information.

15. The method of claim 1, wherein performing the cell reselection comprises:
for cells with the same combined priority of the TA and the frequency point, sorting, by the terminal, the cells according to signal quality and then performing the cell reselection.

16. A method for information transmission, comprising:
broadcasting, by a base station, system information, wherein the system information carries tracking area (TA) information; and
issuing, by the base station, priority information, wherein the priority information is configured for cell reselection of a terminal, wherein the priority information comprises a combined priority of a TA and a frequency point, the combined priority of the TA and the frequency point refers to a priority set based on a combination of the TA and the frequency point.

17. The method of claim 16, further comprising:
broadcasting a first indication in a serving cell, wherein the first indication is configured to indicate whether system information broadcast in the serving cell of the terminal can carry TA information; the priority information at least indicates a TA priority of the TA corresponding to the broadcasted TA information.

18. The method of claim 17, wherein issuing the priority information relating to the TA comprises:
according to the first indication, issuing the system information carrying the TA information in response to a TA to which the serving cell of the terminal being different from a TA to which a neighbor cell belongs; and according to the first indication, carrying no TA information in the system information in response to the serving cell of the terminal and the neighbor cell belonging to a same TA, wherein issuing the system information carrying the TA information comprises at least one of followings:

broadcasting intra-system intra-frequency cell reselection information in the serving cell of the terminal, wherein the intra-system intra-frequency cell reselection information carries TA information of an intra-system intra-frequency cell;

broadcasting intra-system inter-frequency cell reselection information in the serving cell of the terminal, wherein the intra-system inter-frequency cell reselection information carries TA information of an intra-system inter-frequency cell; and broadcasting inter-system cell reselection information broadcast in the serving cell of the terminal, wherein the inter-system cell reselection information carries TA information of an inter-system cell.

19. The method of claim 18, further comprising:

broadcasting a second indication in the serving cell of the terminal, wherein the second indication is configured to indicate that the TA to which the serving cell of the terminal belongs is different from the TA to which the neighbor cell belongs; the system information is configured to carry the TA information after the first indication and the second indication are broadcasted.

20. A communication device, comprising:

an antenna;

a memory;

a processor, connected to the antenna and the memory respectively, and configured to control the antenna to send and receive radio signals by executing an executable program stored in the memory, and configured to:

receive system information broadcast by a serving cell of a terminal;

determine a tracking area (TA) according to TA information carried in the system information;

receive priority information, wherein the priority information comprises a combined priority of the TA and a frequency point, the combined priority of the TA and the frequency point refers to a priority set based on a combination of the TA and the frequency point; and perform cell reselection according to the priority information.

* * * * *